United States Patent [19]

Shimizu

[11] Patent Number: 4,661,988

[45] Date of Patent: Apr. 28, 1987

[54] IMAGE INFORMATION-FILING APPARATUS

[75] Inventor: Makoto Shimizu, Tokyo, Japan

[73] Assignee: Kabushiki Kaisha Toshiba, Kawasaki, Japan

[21] Appl. No.: 641,988

[22] Filed: Aug. 20, 1984

[30] Foreign Application Priority Data

Aug. 26, 1983 [JP] Japan .................................. 58-154965

[51] Int. Cl.⁴ .............................................. G06K 9/00
[52] U.S. Cl. ...................................... 382/65; 340/721
[58] Field of Search ............................. 382/65, 13, 59; 340/722, 721, 745

[56] References Cited

U.S. PATENT DOCUMENTS 4,115,804  9/1978  Morton et al. ......................... 382/59
4,471,348  9/1984  London et al. ....................... 340/722

Primary Examiner—Stephen A. Kreitman
Attorney, Agent, or Firm—Cushman, Darby & Cushman

[57] ABSTRACT

An image information-filing apparatus comprising a two dimensional scanning device for reading a piece of image information, a disc device for storing the piece of image information and a character pattern generator for producing a character pattern corresponding to the time information issued by a time-counter. A piece of image information corresponding to one page of a manuscript is temporarily stored in a page buffer when said image information is read out or written the above-mentioned character pattern denoting the time is attached to the image information stored in the page buffer. The image information stored in the page buffer is rendered visible together with a character pattern denoting the time information by means of a CRT display device or print device.

10 Claims, 9 Drawing Figures

FIG. 5
| SERIAL NUMBER | SEARCH TITLE | SIZE | MEMORY ADDRESS |
|---|---|---|---|
| | | | |
| M, N | m, n | SA1 ~ | SA6 |
FIG. 7A
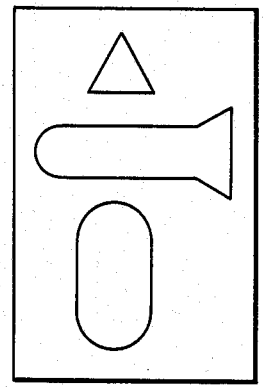
FIG. 7B
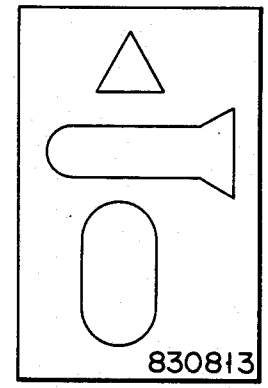

IMAGE INFORMATION-FILING APPARATUS

BACKGROUND OF THE INVENTION

This invention relates to an image information-filing apparatus which causes image information, for example, documents, to be stored in a memory medium and later reproduced therefrom, and more particularly, to an image information-filing apparatus wherein a main memory medium is formed of, for example, the so-called optical disc. Image information is stored in said memory medium, and information for finding each stored image information is stored in the same memory medium or any other memory medium, for example, a magnetic disc. The stored image information is searched out by reference to said search information.

Recently, an image information-filing apparatus has been put to practical use which stores image information consisting of large amounts of documents and impressions with a relatively high density and ensures the quick search and read-out of stored image information.

A description may now be made of a typical example of the above-mentioned image information-filing apparatus. With this apparatus, visible impressions such as documents are optically read by two-dimensional scanning. Pieces of image information thus obtained are stored in a memory medium capable of storing data with a relatively high density such as an optical disc. Image information is regularly registered when search information for the respective pieces of stored image information is stored in another memory medium, for example, a magnetic disc like a floppy disc. When an attempt is made to reproduce the image information stored in the above-mentioned memory medium, the operator externally supplies an input corresponding to a search information for the respective pieces of image information stored in, for example, the magnetic disc. Thus, the desired image information stored in the optical disc is visibly read out by means of an image output device. The image output device is generally provided by, for example, a CRT display device or a print device for converting an image into a hard copy.

With the above-mentioned image information filing apparatus, it often happens that the point of time at which image information was registered or the point of time at which image information was reproduced bears great importance to the registered or reproduced image information. In this case, a data or time previously attached to image information to be registered or reproduced can be effectively and advantageously utilized as reference or distinction data with respect to the related image information.

However, the conventional image information-filing apparatus presented great operational complexities in attaching a date to the image information. For instance, when image information is supplied in the form of a sheet of paper, the operator has to record a date on the paper sheet. When image information is supplied in the form of an optical image by applying, for example, a television camera and projector, it is necessary to previously provide, for example, a card bearing letter denoting a date, and place the card within the viewing field of the camera and projector. When therefore, a date had to be attached to image information, the conventional image information-filing apparatus was accompanied with considerable inconvenience due to the operational complexities experienced by the operator.

SUMMARY OF THE INVENTION

It is accordingly the object of this invention to provide an image information-filing apparatus which enables a date to be easily written on a piece of image information.

To attain the above-mentioned object, this invention provides an image information-filing apparatus which comprises a timer circuit for issuing a date, a character pattern-generating circuit for producing characters representing said date, and a device for writing said character pattern on a piece of image information corresponding to a one page impression previously stored in a page buffer. In this invention, a character pattern, produced by a character pattern-generating circuit upon receipt of a code from a timer circuit, is automatically or manually written with great ease on a piece of image information temporarily stored in a memory circuit.

BRIEF DESCRIPTION OF THE DRAWINGS

FIG. 5 shows the manner in which pieces of image information representing various items of data are stored in a memory unit;

FIGS. 7A and 7B indicate the manner in which a piece of image information is displayed.

DETAILED DESCRIPTION OF THE PREFERRED EMBODIMENT

Figure 1:
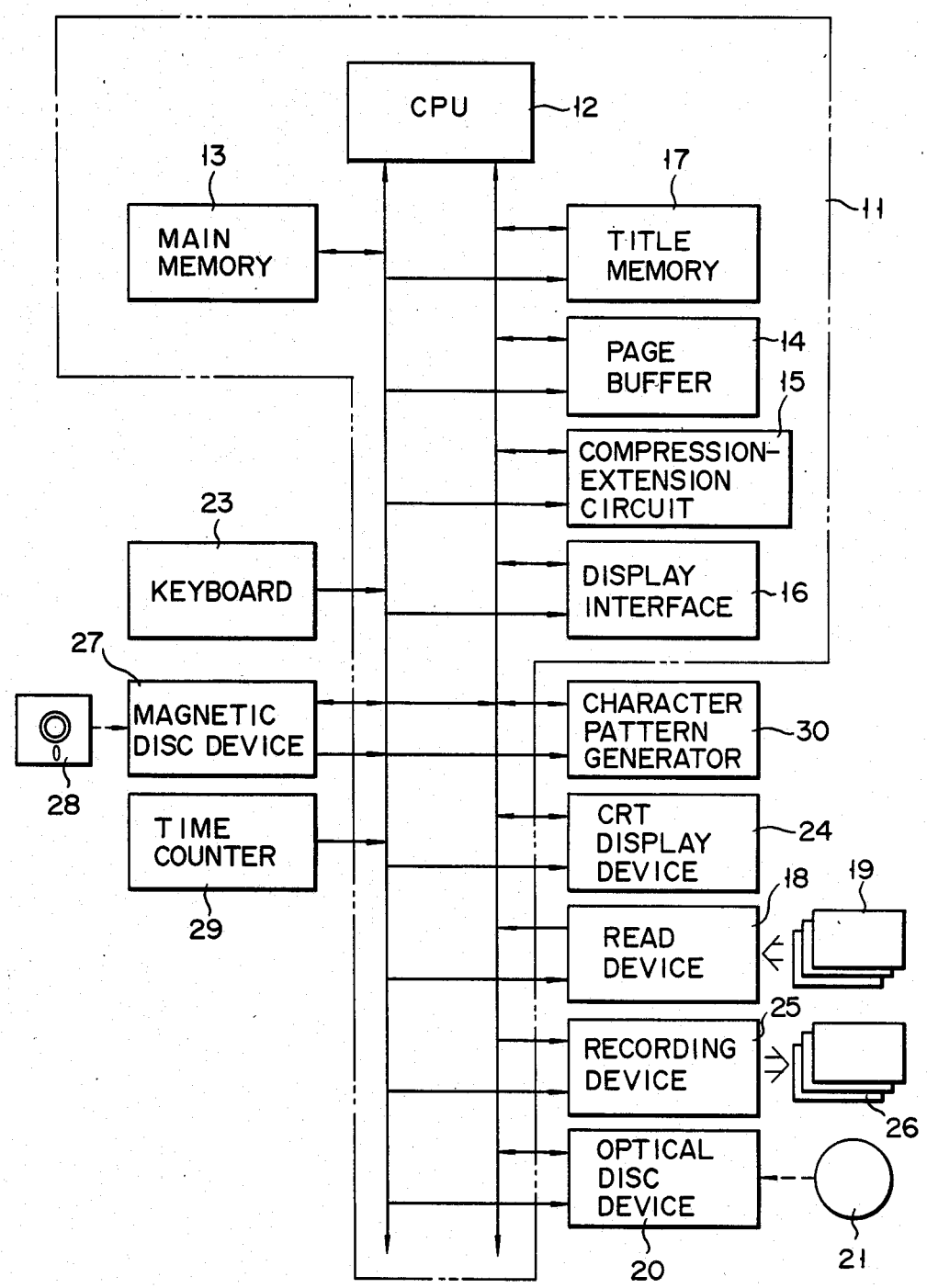
FIG. 1 is a block diagram showing the arrangement of an image information-filing apparatus embodying this invention.

Referring to FIG. 1, a main control device comprises: a central processing unit (CPU) 12 performing various control operations; a main memory 13; a buffer memory, for example, a page buffer 14 having a memory capacity corresponding to at least one unit of image information (for instance, data representing one page of a manuscript); an image information compressing-extending circuit 15 which, when a plurality of the same pieces of data are supplied in succession, is designed to change the pattern of originally picked up image information, thereby causing a smaller amount of data to be displayed than that originally received (to reduce data redundancy) and, in case of need, to regain said redundancy; a display interface 16; and a title memory 17 for storing the whole of the image information read out of a magnetic disc 28 by means of the later described magnetic disc device 27.

With a two-dimentional scanning device 18 for picking up image information, a manuscript (document) 19 is substantially two-dimensionally scanned, for example, by a photosensor like a line sensor, to pick up an impression made thereon in the form of an electric signal. With an optical disc device 20, image information read out by the read-out device 18 and supplied through the main control device 11 is stored in an optical disc 21.

Figure 2:
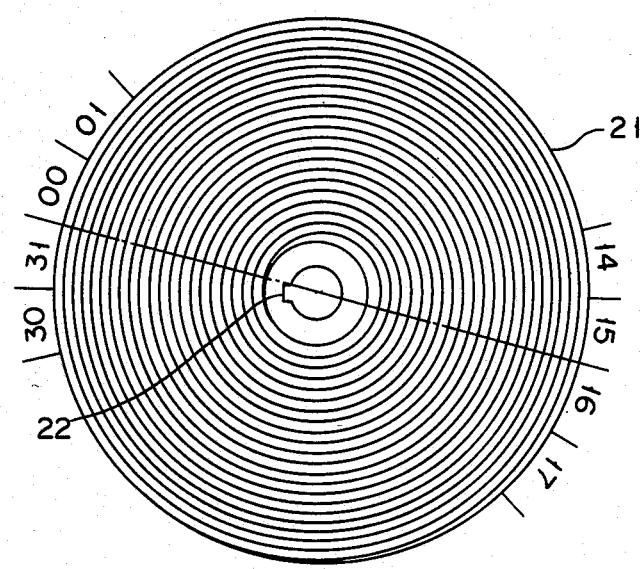
FIG. 2 is a plan view illustrating the construction of an optical disc used with the image information-filing apparatus of FIG. 1.

As shown in FIG. 2, the optical disc 21 is constructed by coating the surface of a substrate, molded from glass or synthetic resin in the form of a disc, with a metal layer of, for example, tellurium or bismuth. A notch bearing an outline of a reference position mark 22 is provided near the center of said metal coating. A memory area on the optical disc 21 is divided into 32 sectors bearing numbers from "00" to "31", consecutively arranged in the circumferential direction with said number "00" taken to correspond to the position of said reference position mark 22.

Refering to FIG. 1, a keyboard 23 is used to supply a specific search title corresponding to a piece of image information which in turn corresponds to one page of a manuscript or various operation instructions. A cathode ray tube display device 24 (hereafter referred to as "the CRT display device") constitutes an image information display section. This CRT display device 24 is used to indicate a piece of image information read out by the scanning device 18 or read out of the optical disc 20 to supply the main control device 11, or a search title or character delivered from the keyboard 23. The CRT display device 24 and the display interface 16 of the main control device 11 jointly constitute an image information display device. A hard copying device 25 is used to produce in the form of a hard copy 26 a piece of image information read out of the optical disc device 20 and supplied through the main control device 11 or a search title read out of the magnetic disc device 27 and supplied through the main control device 11. Stored in the magnetic disc device 28 is filing information such as search data on the original image information. The filing information consists of a search title supplied from the keyboard 23, data as the size of image information corresponding to said search title, a memory address on the optical disc 21 in which said image information is stored, and also address information corresponding to that position in the page buffer 14 in which a character pattern attached to the image information is written. A time-counting device 29 is a timer for issuing information on the current date and time. A character pattern generator 30 produces a character pattern representing information on the current date and time delivered from the time-counting device 29 and supplied through the main control device.

Figure 3:
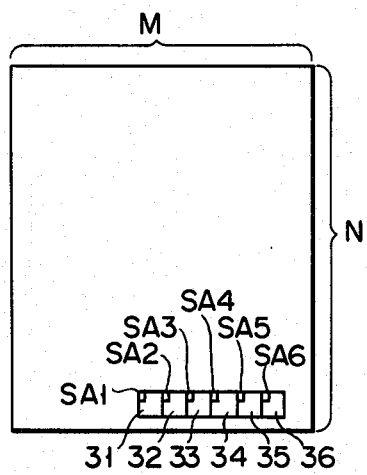
FIG. 3 is a memory map of a page buffer used with the subject image information-filing apparatus.

FIG. 3 shows a memory map on the page buffer 14. This page buffer 14 consists of a memory region constructed by arranging an M number of 1-bit information memory cells in the direction of the row and an N number of 1-bit information memory cells in the direction of the column. For example, six characters generated from the time counter 29 are successively stored in six memory regions 31 to 36. The page buffer 14 is provided with addresses whose numbers progressively increase toward the right side and bottom side of FIG. 4. Among the addresses allotted to the above-mentioned 6 memory regions 31 to 36, that address which has the smallest number is designated as the foremost address $SA_i (i=1$ to 6).

Figure 4:
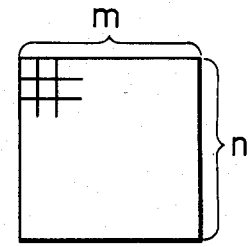
FIG. 4 illustrates an example of a character pattern used with the subject image information-filing apparatus.

FIG. 4 illustrates the arrangement of a dot matrix of a character pattern produced by the character pattern generator 30. One character pattern is formed of an m number of dots grouped in the direction of the row and an n number of dots grouped in the direction of the column. Electrically, these dots are treated as a digital value "1" or "0" corresponding to a white or black dot.

FIG. 5 shows the manner in which pieces of image information representing various items of data are stored in the magnetic disc 28. Stored in this magnetic disc 28 is search information corresponding to each optical disc 21 which consists of a serial number for each piece of image information, search title, image information size and memory addresses for each optical disc 21, the values of M and N corresponding to the memory size of the page buffer 14, the foremost addresses SA1 to SA6 corresponding to the memory regions 31 to 36, and the values of m and n representing the matrix size of a character patterns.

A description may now be made of the operation of an image information-filing apparatus embodying this invention which is arranged as mentioned above.

When a piece of information is registered, the operator actuates the keyboard 23 to select the registration mode. Then, the operator supplies a search title for the image information to be registered. At this time, the CPU 12 examines to see whether or not input data supplied as a search title has a proper pattern as viewed from the registration of image information from the number and kind of characters used in a search title in conformity to the previously defined format of a search title. Further, all the previously registered search titles are examined. If the above-mentioned examination proves that all the search titles are correct, the CPU 12 causes the above-mentioned correct data supplied as a search title to be stored in the main memory 13. When the operator places one page of a manuscript 19 on the scanning device 18, the CPU 12 actuates the scanning device 18 and optical disc device 20. Therefore, the scanning device 18 carries out the photo-electric conversion of image information impressed on the manuscript 19 by two-dimensional scanning. Pieces of photoelectrically converted image information corresponding to the respective scanning lines are successively supplied to the page buffer 14, which in turn stores image information corresponding to one page of the manuscript 19. Said one-page image information is delivered to the display interface 16 to be temporarily stores therein. The image information read out of the display interface 16 is displayed on the CRT display device 24.

When the displayed image information proves satisfactory, the operator pushes a registration key (not shown) mounted on the keyboard 23. Then, under the control of the CPU 12, pieces of image information corresponding to, for example, one page of the manuscript 19 temporarily stored in the page buffer 14 are successively delivered to the image information pattern-controlling circuit 15. In the image information pattern-controlling circuit is, pieces of information corresponding to scanning lines are subjected to data compression by, for example, the so-called modified Huffman conversion. The pieces of information corresponding to the scanning lines whose patterns have been compressed are supplied to the optical disc device 20. Stored in the optical disc 21 of said optical disc device 20 are pieces of image information corresponding to the scanning lines which are successively supplied from the aforementioned image information compressing-extending circuit 15.

When all the pieces of image information have been stored in a memory device, the CPU 12 issues signals denoting memory addresses corresponding to the track numbers of the optical disc 21 in which pieces of image information are stored, the number of that sector of said optical disc 21 in which data is initially stored, the length of data to be registered, and the size of the whole image information. All the signals issued from the CPU 12 are made to correspond to the items of data included in a search title and stored in the main memory 13 together with the search information. The CPU 12 supplies the magnetic disc 28 of the magnetic disc device 27 with search information or data, memory addresses and image information size read out of the main memory 13.

When any other information is registered, image information is stored in the optical disc 21, and search information is stored in the magnetic disc 28 as in the preceding case where image information was stored. Items of data such as M, N, SA1 to SA6, m and n are stored in the magnetic disc 28 before or after the respective items or search information are stored therein.

A description may now be made of the search for a piece of image information registered through the above-mentioned process. The operator actuates the keyboard 23 to select the search mode. A search title is supplied. The CPU 12 successively carries out comparison between the new search title and the preceding search titles, previously stored in the title memory 17, in order to determine whether the new search title coincides with any of the previously stored search titles. When the determination proves that the new search title does not coincide with any of the previously stored search titles, the CPU 12 causes "no image information" to be indicated on the CRT display device 24 and the CPU is held in a waiting position until the succeeding search title is supplied. If the new search title coincides with any of the preceding search titles, then the CPU 12 causes the preceding search titles which coincide with new search title to be read out of the title memory 17 and displayed on the CRT display device 24. When observing the displayed search title, the operator pushes a search key (not shown) on the keyboard 23. In response, the CPU 12 causes memory address information, denoting the image information size, the track number and the number of the sector of the optical disc 21 in which image information was initially stored, to be read out of the search title memory 17. The CPU 12 causes a piece of image information to be reproduced by the optical disc device 20 from that track on the optical disk 21 which corresponds to the number of the track from which a piece of image information was read out.

Under the control of the CPU 12, the pieces of image information read out from the optical disc device 20 are supplied to the image information compressing-extending circuit 15. The pieces of image information are subjected to the reverse MH convention to regain the original redundancy, and successively supplied to the page buffer 14. Thus, all the pieces of image information corresponding to one page of the copy 19 which have been reproduced from the optical disc are stored in the page buffer 14. Under the control of the CPU 12, the one page image information is displayed on the CRT display device 24 by means of the display interface 16, or a hard copy 26 of said one copy image information is produced by a hard copying device 25.

Figure 6:
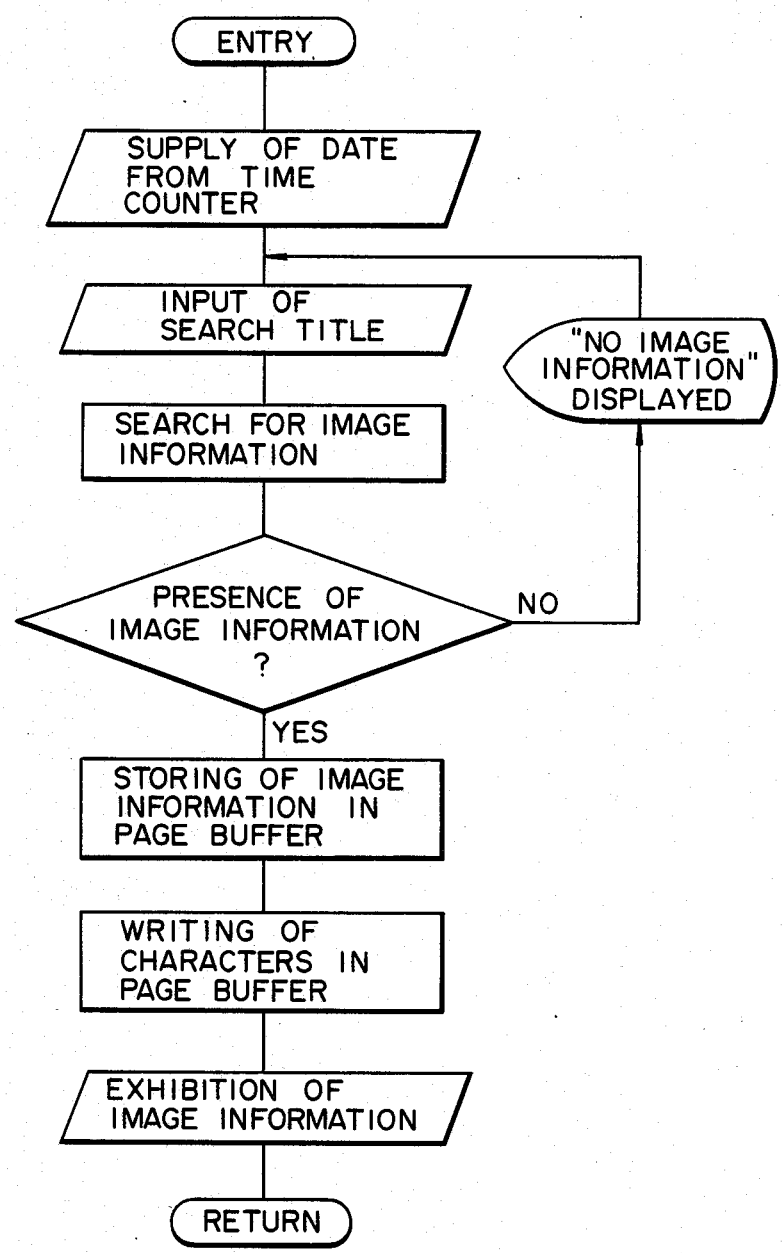
FIGS. 6 and 8 are flow charts illustrating the sequential operation steps taken by the subject image information filing apparatus.

A description may now be made, with reference to the flow chart of FIG. 6, of the process of attaching that date to one or more of the previously registered pieces of image information on which said image information is searched for the first time. The operator himself selects said date-attaching mode. For purposes of explanation, it will be assumed that, in this case, the same date is attached to a group of pieces of image information which are simultaneously searched for, and the current date is Aug. 13, 1983. Then, the time counter 29 issues a code corresponding to a character group consisting of 6-digit numerals of "830813". The code representing these numerals is temporarily stored in the prescribed region of the main memory 13. The operator actuates the keyboard 23 to supply a search title corresponding to the image information to which the current date is to be attached. Then, the CPU 12 carries out collection between the supplied search title and the search title previously stored in the title memory 17. That of the previously stored search titles which coincides with the freshly supplied search title is displayed on the CRT display device 24. Later, when the operator pushes a search key, a piece of image information stored in the corresponding track on the optical disc 21 is reproduced b the optical disc device 20 under the control of the CPU 12. The reproduced data is extended by the compression-extension circuit 15. Thus, a piece of information corresponding to one page of the manuscript 19 which regained the original pattern is stored in the page buffer 14. Thereafter, the CPU 12 transfers the date code previously stored in the main memory 13 to the character pattern generator 29, with the characters constituting the code being read out one after another. The character pattern generator 29 produces a matrix-shaped pattern shown in FIG. 4 in conformity to the date code received. Thereafter, the CPU 12 writes the characters of said pattern successively in the six memory regions 31 to 36 (FIG. 3) of the page buffer 14 in which the image information corresponding to one page of the manuscript 19 is previously stored. Therefore, pieces of the original image information, previously stored in the memory regions 31 to 36, are partly changed into the respective characters of said pattern. After the writing of a character pattern representing a date, the CPU 12 causes the image information stored in the page buffer 14 to be displayed on the CRT display device 24 through the display interface 16, or causes the image information stored in said page buffer 14 to be converted into a hard copy by the recording device 25.

FIG. 7A illustrates a piece of image information corresponding to one page of the manuscript 19 before a character pattern representing a date is written. FIG. 7B indicates the image information of FIG. 7A to which the date is attached by th previously described process. Namely, an additional impression of the date characters "830813" produced by the time counter 29 is indicated at the bottom of FIG. 7B.

Figure 8:
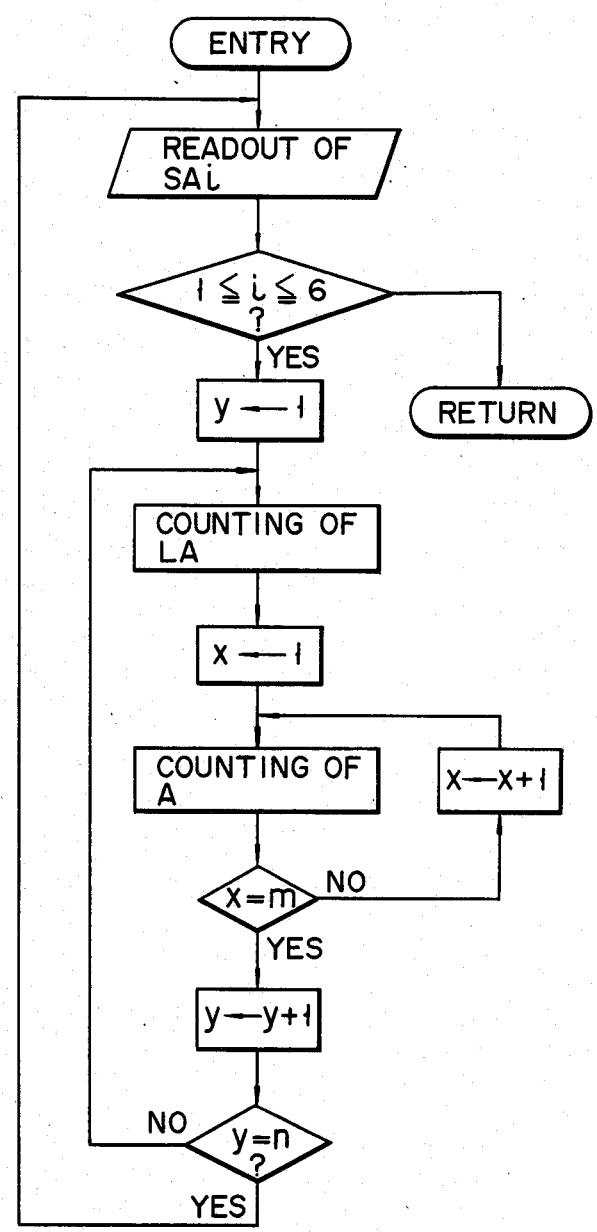

A description may now be made with reference to the flow chart of FIG. 8 of one example of the process of accurately designating all the addresses of the page buffer 14 when a character pattern produced by the character pattern generator 30 is written in said page buffer 14. The foremost address $SA_i$ ($i=1$ to 6), previously read out of the magnetic disc 27 and then stored in the search title memory 17, is read out therefrom. Thereafter a given variable y is set at 1. A variable LA is calculated by the following formula including said variable y:

$$LA = (M-m)(y-1).$$

After the calculation of the variable LA, a given variable x is set at 1. Later, the address A of the page buffer 14 in which a date character pattern is written is designated by the following equation including the variables LA and x:

$A = SA_i + LA + (x-1)$.

Next, judgment is made as to whether the variable x coincides with m. When this is not the case, 1 is added to the variable x, and it is tried again to designate the address A. If the variable x coincides with n, 1 is added to the variable y. Later, judgment is made as to whether y coincides with n. If this is not the case, the variable LA is computed again to designate the address A. When the variable y coincides with n, a new foremost address SAi in read out. Thereafter, the above-mentioned calculation process is carried out to designate said new address SAi. The designation of an address is brought to an end when the same calculation process as described above is brought to an end with respect to the disignation of the six foremost addresses SA1 to SA6 previously stored in the title memory 17. The characters M, m, n, used in the above-calculation processes, represent the numerical values previously stored in the magnetic disc 28.

The calculation based on the flow chart of FIG. 8 figures out the successive positional displacements LA from the foremost address SAi (of, for example, the memory region 31 of FIG. 3) of the following segments constituting the extreme left column of the matrix of the memory region 31 of FIG. 3. The positions of the addresses A of the respective matrix segments of each row are calculated from the value of the above-mentioned positional displacement LA, thereby computing the position of the addresses A of all the segments of the matrix of the memory region 31. The positions of the addresses A of all the segments of the matrixes of the memory regions of 32 to 36 shown in FIG. 3 are defined in the same manner. The above-mentioned computed values define the positions of all the addresses A. The respective date characters constituting one pattern which has been delivered from the character pattern generator 29 are stored in the page buffer 14 in the form of dots, thereby enabling a date to be attached to a piece of image information.

With the above-mentioned embodiment, a date to be attached to a piece of image information is produced by the time counter 29 before the searching of the image information. Therefore, the present invention offers the advantages that the operations-manual work of writing a date as is the case with the conventional image information-filing apparatus is completely dispensed with, namely, a date can be very easily attached to a piece of image information.

The foregoing embodiment refers to the case where a character pattern attached to a piece of information represented a date. However, the character pattern attached to a piece of image information may denote a current time. Further, it is possible to change the size of a character pattern to be attached to a piece of information and the position of said character pattern on the image information by varying the data related to M, N, m, n, SA1 to SA6, which are to be stored in the magnetic disc. The above-mentioned embodiment refers to the case where a character pattern was attached to a piece of image information which was searched for. However, it is possible to attach a character pattern to a piece of information when it is registered by applying substantially the same process as described above.

The foregoing image information filing apparatus was not arranged that the attachment of a date to a piece of information was effected by the operations work each time the search or registration of image information was undertaken. However, it is possible to cause information on a current date to be automatically attached to a piece of information at the time of its registration and/or search, or to select a required mode of operation by means of, for example, an operation mode-specifying device.

The optical disc 20 applied in the foregoing embodiment may be replaced by another memory means, for example, a type involving a magnetic, memory medium, a type based on the application of a static capacity-recording system, or a type utilizing a thermo-magnetic or opto-magnetic recording system.

Search information is sometimes stored in memory means involving a memory medium other than a magnetic disc. However, it is preferred to store searched image information in a memory means which enables the read/write operation, particularly the memory means which allows for the re-writing of stored data and easy random access. When the means for storing image information consists of a type allowing for an easy read-write operation, it is possible to store seach title and a piece of image information in the same memory medium.

What is claimed is:

1. An image information-filing apparatus comprising:
   image information-reading means for optically reading a visible image to provide image information;
   temporary memory means for temporarily storing at least one portion of image information delivered from said image information-reading means;
   means for issuing time stamp information indicative of at least one of time information and date information;
   character pattern-generating means for generating a character pattern corresponding to said time stamp information;
   writing means for writing the character pattern of time information generated by said character pattern-generating means in said temporary memory means;
   displaying means for displaying at least part of said image information stored in said temporary memory means; and
   image information storing means for recording the image information and character pattern stored in said temporary memory means.

2. The image information-filing apparatus according to claim 1, wherein said time information-issuing means generates information representing a date.

3. The image information-filing apparatus according to claim 1, wherein said time information-issuing means further generates a string of character codes representing a time.

4. The image information-filing apparatus according to claim 1, wherein said character pattern-generating means includes a plurality of memory regions for storing a plurality of character patterns corresponding to the time.

5. The image information-filing apparatus according to claim 1, wherein said image information-reading means is a two-dimensional scanning device.

6. An image information-filing apparatus comprising:
   image information-storing means for storing plural pieces of image information;
   temporary memory means for temporarily storing at least one piece of image information reproduced by said image information-storing means;
   means for issuing time information;

character pattern-generating means for generating a character pattern corresponding to said time information;

writing means for writing the character pattern of time information generated by said character pattern-generating means into said temporary memory means so that the character pattern of time information is stored as part of the piece of image information stored in the temporary memory means;

displaying means for displaying at least a portion of said piece of information stored in said temporary memory means; and image information-output means for outputting, in the form of hard copy, at least a portion of said information stored in said temporary memory means.

7. The image information-filing apparatus according to claim 6, wherein said time information-issuing means generates information representing a date.

8. The image information-filing apparatus according to claim 6, wherein said time information-issuing means further generates a string of character codes representing the time information.

9. The image information-filing apparatus according to claim 6, wherein said character pattern-generating means includes a plurality of memory regions for storing a plurality of character patterns corresponding to the time information.

10. An image information-filing apparatus comprising:

image information-storing means for storing plural pieces of image information including character patterns indicative of time information, said character patterns being written with image information in said image information-storing means;

temporary memory means for temporarily storing at least one piece of image information reproduced by said image information-storing means;

displaying means for displaying a piece of image information storing said temporary memory means; and image information-output means for outputting, in the form of hard copy, at least a portion of said image information stored in said temporary memory means.

* * * * *